Dec. 29, 1925.　　　　P. DUBOSCLARD　　　　1,567,717
FRICTION DEVICE
Filed Jan. 3, 1924
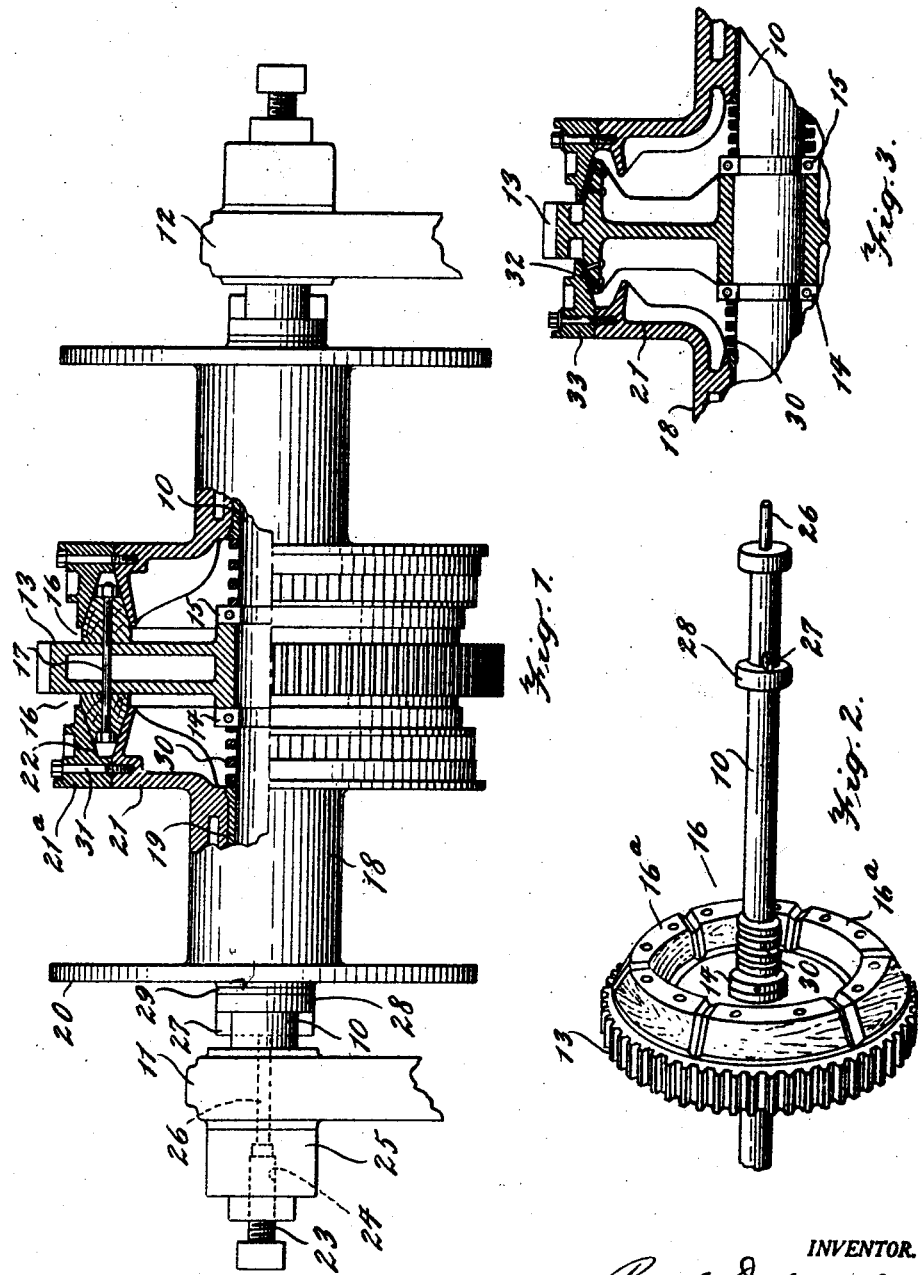
INVENTOR.
Paul Dubosclard
BY
Gifford, Bull + Smith
his ATTORNEYS Patented Dec. 29, 1925.

1,567,717

UNITED STATES PATENT OFFICE.

PAUL DUBOSCLARD, OF BROOKLYN, NEW YORK, ASSIGNOR TO LIDGERWOOD MANUFACTURING COMPANY, OF NEW YORK, N. Y., A CORPORATION OF NEW YORK.

FRICTION DEVICE.

Application filed January 3, 1924. Serial No. 684,110.

*To all whom it may concern:*

Be it known that I, PAUL DUBOSCLARD, a citizen of the Republic of France, residing at Brooklyn, in the county of Kings and State of New York, have invented certain new and useful Improvements in Friction Devices, of which the following is a specification.

My invention more particularly relates to friction devices in which access may readily be had to worn parts.

My invention consists of certain novel parts and combinations of parts particularly pointed out in the claims.

The following is a description of a mechanism embodying my invention, in the form at present preferred by me, but it will be understood that various modifications and changes may be made therein without departing from the spirit of my invention and without exceeding the scope of my claims.

My invention will best be understood by reference to the accompanying drawings, in which Fig. 1 is a side view, partly in section, of a friction device embodying my invention; Fig. 2 is a perspective view of a member carrying a removable friction element and Fig. 3 is a fragmentary section similar to the sectional part of Fig. 1, and illustrating a modified form of my invention.

Like reference characters indicate like parts throughout the drawings.

The illustrative form of friction device comprises a shaft 10 having its bearings in supports 11 and 12. Mounted on the shaft 10 and normally immovable longitudinally thereof is a driving member 13, shown as a gear, and which is free to rotate on the shaft, but which is prevented from longitudinal movement thereof by collars 14 and 15 on opposite sides of the gear and secured to the shaft in a well-known manner. It will be understood that the gear 13 is driven in any suitable manner. I have designated the gear 13 as a "driving member" herein to distinguish the same from the member or members which are driven thereby. The gear 13 is provided on opposite sides with removable friction elements, as indicated generally at 16, each composed of removable friction blocks 16ª preferably bevelled on the sides thereof and which are suitably secured to the sides of the gear as by bolts 17 passing through the friction blocks on opposite sides of the gear and through the gear itself. The blocks on opposite sides of the gear and the parts associated therewith may be and preferably are the same in construction, and I shall accordingly describe only the parts on one side of the gear (those at the left).

Mounted adjacent to the gear is a member driven thereby, which is shown as a drum 18, revolubly mounted on the shaft 10, and movable longitudinally thereof, a bushing 19 preferably being interposed between the drum and the shaft. The drum 18 is provided with the usual flange 20, the inner flange 21, which is adjacent to the gear 13, being provided with a friction groove 22 engageable with the friction blocks 16ª.

The drum is moved longitudinally of the shaft by mechanism which is well understood in the art, and which may briefly be described as follows: A thrust screw 23 which may be rotated manually or automatically in any desired manner, is received in a screw-threaded opening 24 in a stationary part 25. The inner end of the screw member 23 engages a pin 26 (indicated in dotted lines in Fig. 1), which is received in an opening formed axially of the shaft. The inner end of the pin 26 engages a cross key 27 which is received in a transverse slot in the shaft and which is longer than the cross key, the cross key, in turn, engaging a collar 28 which, in turn, engages at 29 the hub of the drum. The drum is normally forced away from the gear and the friction groove 22, out of engagement with the friction blocks 16ª by a spring 30 which is interposed between the collar 14 adjacent to the gear and the adjacent end of the drum 18. By turning the screw 23 in the appropriate direction, the drum 18 is moved to the right in opposition to the spring 30, thereby bringing the friction groove 22 into engagement with the friction blocks 16ª.

The peripheral portion of the flange 21 of the drum 18 is separately formed and is removable from the remainder of the flange and the drum. This peripheral portion is indicated in Fig. 1 at 21ª, and is secured to the inner part of the flange by bolts 31. When, in practice, the friction blocks 16ª become worn, by removing the bolts 31 and the peripheral portion 21ª, access is had to the removable friction blocks, which may then readily be repaired or renewed.

In Fig. 3, I have illustrated my invention in connection with a removable friction element which is in the form of an annular band or member 32, which is engaged by an overhanging friction element 33, which is attached to the inner portion of the flange of the drum in a manner similar to that described in connection with Fig. 1. By removing the peripheral portion 33, access is had to the band 32 which may then be repaired or renewed.

Friction blocks have hitherto commonly been removed by separating the driving and the driven members. As the drums, gears and shafts, however, sometimes weigh many tons, special machinery to lift them out of place, so that the drum can be slid back and the old blocks removed and new ones put on, is required, and this is a tedious and expensive operation. In accordance with my invention, the removable friction element may be placed in and removed from position on the member on which it is mounted, while the driving and driven members occupy their normal positions and, therefore, with a minimum loss of time and expense.

While I have shown removable friction elements secured to both sides of the driving member, it will be understood that they could be mounted on only one side and cooperate with the driven member. Furthermore, it is to be understood that either the driving or driven member may carry the removable friction element.

I claim:

1. In combination, a driving member and a driven member provided with respective friction elements engageable with each other, one of said friction elements being formed of removable sections, the other friction element comprising a continuous annular portion at least partially surrounding the first friction element, and means for removably securing said annular portion to its member.

2. In combination, a driving member and a driven member provided with respective friction elements engageable with each other, one of said friction elements comprising sections, bolts for securing said sections to the side of the driving member, the other friction element comprising a continuous annular portion at least partially surrounding the first friction element, and means for removably securing said annular portion to its member.

3. In combination, a driving member and a driven member provided with respective friction elements engageable with each other, one of said friction elements comprising sections, bolts for securing said sections to the side of the driving member, the other friction element comprising a continuous annular portion at least partially surrounding the first friction element, and means for removably securing said annular portion to its member, the bolts securing said removable sections to the driven member being located outside of the inner wall of said annular portion, whereby the bolts may readily be removed when the annular portion is removed.

PAUL DUBOSCLARD.